US009609497B2

(12) United States Patent
Li et al.

(10) Patent No.: US 9,609,497 B2
(45) Date of Patent: Mar. 28, 2017

(54) INTELLIGENT EMERGENCY SESSION HANDLING

(71) Applicant: Verizon Patent and Licensing Inc., Basking Ridge, NJ (US)

(72) Inventors: Mingxing S. Li, San Jose, CA (US); Priscilla Lau, Fremont, CA (US); Xuming Chen, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 579 days.

(21) Appl. No.: 13/679,049

(22) Filed: Nov. 16, 2012

(65) Prior Publication Data

US 2014/0140268 A1   May 22, 2014

(51) Int. Cl.
*H04M 11/04* (2006.01)
*H04W 4/22* (2009.01)

(52) U.S. Cl.
CPC .................................... *H04W 4/22* (2013.01)

(58) Field of Classification Search
USPC .......................... 370/255, 235, 328; 455/404
See application file for complete search history.

(56) References Cited

U.S. PATENT DOCUMENTS

| 5,323,444 | A  | * | 6/1994 | Ertz et al. ...................... 379/45 |
| 2008/0205267 | A1 | * | 8/2008 | El Barachi et al. .......... 370/230 |
| 2010/0003954 | A1 | * | 1/2010 | Greene et al. ............. 455/404.1 |
| 2011/0076982 | A1 | * | 3/2011 | Li et al. ..................... 455/404.1 |
| 2012/0014332 | A1 | * | 1/2012 | Smith et al. .................. 370/329 |

\* cited by examiner

*Primary Examiner* — Edan Orgad
*Assistant Examiner* — Sithu Ko

(57) ABSTRACT

An access control device may include logic configured to receive a request from a user device to set up a packet connection for an emergency session to a packet data network via an access network. The logic may be further configured to determine a location associated with the user device; identify a public safety answering point associated with the determined location; determine whether a connection capacity associated with the identified public safety answering point has been reached; and reject the request to set up the packet connection for the emergency session, in response to determining that the connection capacity associated with the identified public safety answering point has been reached.

20 Claims, 6 Drawing Sheets

INTELLIGENT EMERGENCY SESSION HANDLING

BACKGROUND INFORMATION

A user of a mobile communication device may initiate an emergency call by dialing an emergency phone number, such as 911. A service provider may route the emergency call to a Public Safety Answering Point (PSAP), where the call may be answered by an operator. The operator may obtain information from the user, such as the nature of the emergency and the precise location of the user, and may dispatch assistance to the user's location, such as a police, firefighting, and/or emergency medical service. A limited number of available connections may exist from the service provider network to a PSAP. In a natural disaster scenario, a large number of callers may initiate emergency calls, which may overwhelm resources of the service provider network.

DETAILED DESCRIPTION OF PREFERRED EMBODIMENTS

The following detailed description refers to the accompanying drawings. The same reference numbers in different drawings identify the same or similar elements.

In a packet switched provider network, such as a network that uses an Internet Protocol (IP) Multimedia Subsystem (IMS), an emergency call may go through two stages. In stage one, a packet connection (e.g., an IP connection) may need to be established between a user device and the provider network via an access network. The access network may not be associated with the same provider as the provider network. For example, in some implementations, the provider network and the access network may be operated by the same entity (e.g., company), while in other implementations, the provider network and the access network may be operated by different entities.

In stage two, a connection may need to be established with a Public Safety Answering Point (PSAP) via a gateway and a selective router. For example, an IMS network may establish a connection between the user device and the gateway using an IP connection and the gateway may establish a connection to the selective router using time division multiplexing (TDM). A limited number of connections may exist between the PSAP and the IMS network. During a natural disaster scenario, a large number of users may initiate emergency calls to the PSAP. If all the connections from the IMS network to the PSAP are being used, additional calls to the PSAP may be blocked due to the PSAP circuit being busy after stage one resources were already used to establish a packet connection, thereby wasting stage one resources.

An implementation described herein relates to intelligent emergency session handling. A number of packet connections for emergency calls set up by an access network to the provider network may be limited based on the connection capacity. An access control device in the access network may control the establishment of packet connections to the provider network. The access control device may maintain a database of PSAPs. The PSAP database may include information about the connection capacity associated with each PSAP reachable by the access network. When a request is received from a user device to establish a packet connection to the provider network for an emergency call, the access control device may determine the location of the user device and may identify a PSAP associated with the determined location. The access control device may then determine a current connection load of the identified PSAP and may determine whether the current connection load has reached the connection capacity of the identified PSAP. If the connection capacity has been reached, the request for a packet connection for an emergency call may be rejected.

Figure 1:
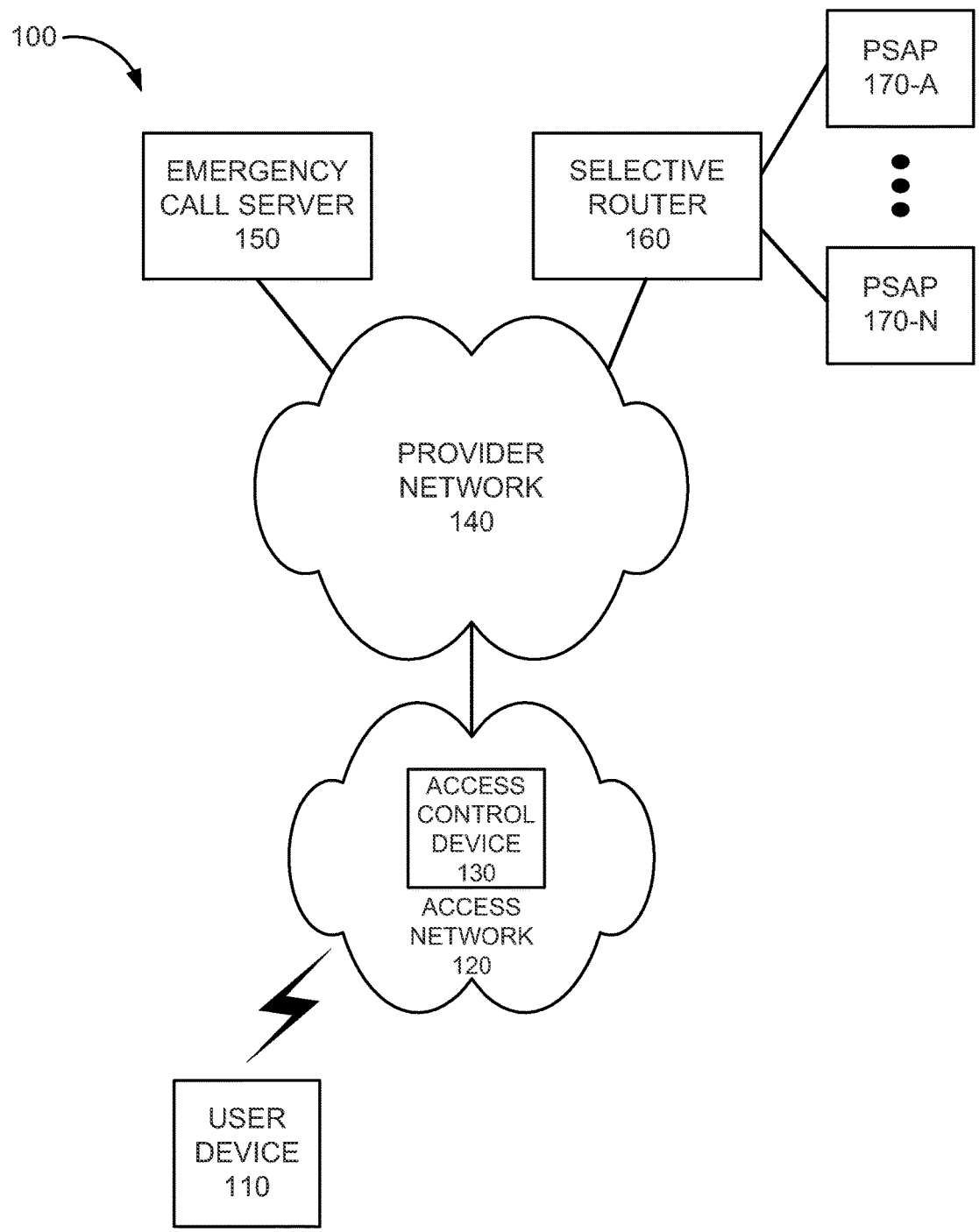
FIG. 1 is a diagram illustrating an exemplary environment according to an implementation described herein.

FIG. 1 is a diagram illustrating an exemplary environment 100 according to an implementation described herein. As shown in FIG. 1, environment 100 may include a user device 110, an access network 120, a provider network 140, an emergency call server 150, a selective router 160, and PSAPs 170-A to 170-N (referred to herein collectively as "PSAPs 170" and individually as "PSAP 170"). While FIG. 1 shows a single user device 110, a single access network 120, a single emergency call server 150, and a single selective router 160 for illustrative purposes, in practice, environment may include multiple user devices 110, multiple access networks 120, multiple emergency call servers 150, and/or multiple selective routers 160.

User device 110 may include any device capable of communicating with PSAP 170 over a wireless connection. For example, user device 110 may include a mobile phone, a smart phone, a tablet computer, a laptop computer, a personal digital assistant (PDA), a gaming system, a media playing device, or another type of portable communication device.

Access network 120 may include a wireless access network that enables user device 110 to communicate with access network 120 using one or more base stations. As an example, access network 120 may include a wireless access network based on the Long Term Evolution (LTE) standard specified by the 3$^{rd}$ Generation Partnership Project (3GPP). An LTE wireless access network may include one or more devices that implement logical entities interconnected via standardized interfaces and that provide packet-switched services between user device 110 and provider network 140. As another example, access network 120 may include a code division multiple access (CDMA) wireless access network, such as a CDMA one times radio transmission technology (1×RTT) network, a CDMA High Rate Packet Data (HRPD) network (which may include a CDMA evolution optimized data only (EV-DO) network), or a CDMA enhanced HRPD (eHRPD) network. As yet another example, access network 120 may include an access network based on a Global System for Mobile Communication (GSM) standard, such as a General Packet Radio Service (GPRS) network, an Enhanced Data Rates for GSM Evolution (EDGE) network, a Universal Mobile Telecommunications System (UMTS) network (also known as a wideband CDMA (W-CDMA) network), or a High Speed Packet Access (HSPA) network.

Access network 120 may include an access control device 130. While FIG. 1 shows a single access control device 130 for illustrative purposes, in practice access network 120 may include multiple access control devices 130. Access control device 130 may control access to provider network 140 via access network 120 and may enable the establishment of a packet connection (e.g., IP connectivity) between user device 110 and provider network 120. As an example, if access network 120 includes an LTE network, access control device 130 may include a Mobility Management Entity (MME) or a Packet Data Network Gateway (PGW). As another example, if access network 120 includes an eHRPD network, access control device 130 may include an Enhanced Packet Control Function device or a High Rate Packet Data Serving Gateway device. As yet another example, if access network 120 includes a GSM network, access control device 120 may include a Serving General Packet Radio Service (GPRS) Support Node (SGSN) or a Gateway GPRS Support Node (GGSN).

Access control device 130 may maintain a PSAP database that may keep track of the connection capacity and the connection load of each PSAP 170 reachable by access network 120. If a connection capacity has been reached for a particular PSAP 170, access control device 130 may reject further connection requests by user devices 110 to the particular PSAP 170.

Provider network 140 may include a packet-switched network, a circuit-switched network, or a combination thereof. Provider network 140 may include a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, and/or a combination of thereof.

Provider network 140 may include an IMS network (not shown in FIG. 1). An IMS network may include a network for delivering IP multimedia services as specified by 3GPP and may provide media flows between user device 110 and external IP networks or external circuit-switched networks (not shown in FIG. 1). Provider network 140 may enable access network 120, emergency call server 150, and/or selective router to communicate with each other.

Emergency call server 150 may include one or more devices, such as server devices, that maintain information relating to PSAPs. For example, emergency call server 150 may store information that relates a particular PSAP to a particular geographic area, to a particular access network 120, to a particular provider network 140, and/or to another criterion. Emergency call server 150 may provide the information relating to PSAPs to selective router 160 and/or to access control device 130.

Selective router 160 may include one or more network devices, such as routers or switches, which may switch or route traffic to a particular PSAP 170. For example, selective router 160 may maintain a routing table that maps a particular location of user device 110 to a particular PSAP 170. When selective router 160 receives a call from user device 110 (e.g., a stream of packets associated with a particular user device 110), selective router 160 may identify a location for user device 110 based on information included in the call signal flow, may look up a particular PSAP 170 associated with the identified location in the routing table, and may route the call to the identified PSAP 170.

PSAP 170 may include one or more devices at a call center responsible for answering emergency calls, or other types of messages, such as emergency Short Message Service (SMS) messages. A PSAP 170 may receive an emergency call from user device 110, along with information relating to the emergency call, such as the location of user device 110. An operator at PSAP 170 may answer the emergency call, may obtain information from the user, such as confirmation of the user's location and the nature of the emergency, and may dispatch assistance to the user's location based on the nature of the emergency, such as police, firefighting, and/or emergency medical services.

Although FIG. 1 show exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
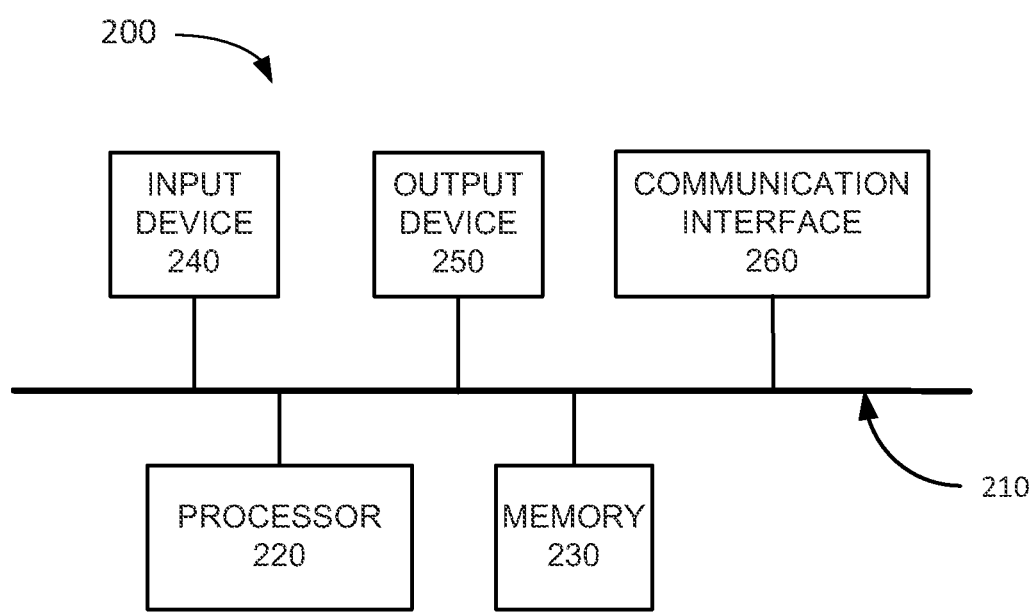
FIG. 2 is a diagram illustrating an exemplary device that may be included in a component of the environment of FIG. 1 according to an implementation described herein.

FIG. 2 is a diagram illustrating an exemplary device 200 that may be included in a component of the environment of FIG. 1 according to an implementation described herein. User device 110, access control device 130, emergency call server 150, selective router 160, and/or PSAP 170 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to intelligent handling of emergency sessions. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
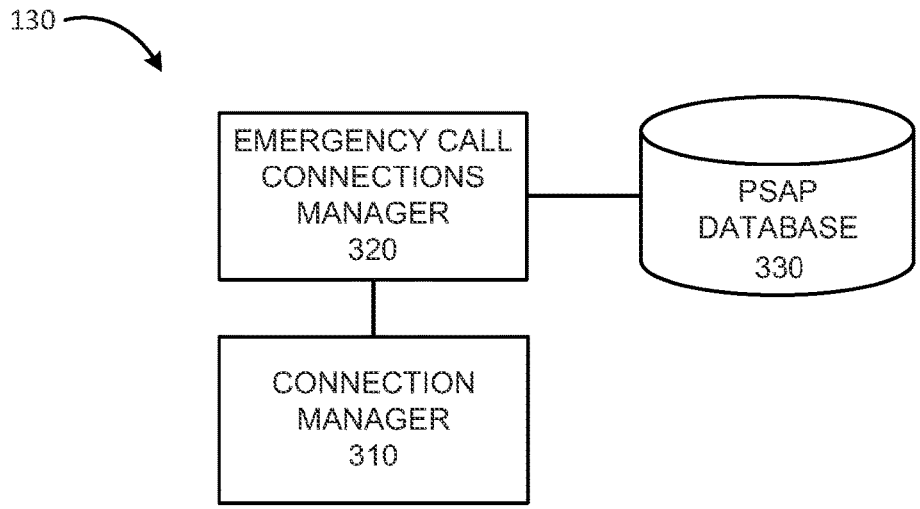
FIG. 3 is a diagram illustrating exemplary functional components of the access control device of FIG. 1 according to an implementation described herein.

FIG. 3 is a diagram illustrating exemplary functional components of access control device 130 according to an implementation described herein. The functional components of access control device 130 may be implemented, for example, via processor 220 executing instructions from memory 230. Alternatively, some or all of the functional components of access control device 130 may be implemented via hard-wired circuitry. As shown in FIG. 3, access control device 130 may include a connection manager 310, an emergency call connections manager 320, and a PSAP database 330.

Connection manager 310 may set up packet connections between user device 110 and provider network 140. For example, connection manager 310 may receive a request from user device 110, via a base station, to set up an IP connection, may send a request to a packet data network gateway to provider network 140 to reserve resources for the IP connection, and/or may instruct the base station to reserve resources for the IP connection. In some implementations, connection manager 310 may further handle handover operations to handover the IP connection from a first base station to a second base station if user device 110 changes locations.

Emergency call connections manager 320 may monitor requests for packet connections and may identify requests for an emergency connection. For example, emergency call connections manager 320 may determine whether user device 110 initiated a telephone call to an emergency number, such as 911, or another emergency number (e.g., a local emergency number that is routed to a PSAP). When emergency call connections manager 320 detects a request to set up a connection for an emergency call, emergency call connections manager 320 may determine a particular PSAP associated with user device 110, may determine a connection load for the identified PSAP, and may reject the request if a connection capacity of the identified PSAP has been reached. Emergency call connections manager 320 may access PSAP database 330 when processing a request to set up a connection for an emergency call. PSAP database 330 may store information relating to particular PSAPs. Exemplary information that may be stored in PSAP database 330 is described below with reference to FIG. 4.

Furthermore, emergency call connections manager 320 may maintain the information stored in PSAP database 330. For example, emergency call connections manager 320 may obtain information relating to particular PSAPs 170 from emergency call server 150, from selective router 160, and/or from another access control device 130. Moreover, when a connection to a PSAP 170 is set up, emergency call connections manager 320 may store an indication in PSAP database 330 that a connection load for a particular PSAP 170 has increased and may send an indication to another access control device 130 that the connection load for a particular PSAP 170 has increased. When a connection to PSAP 170 is terminated, emergency call connections manager 320 may store an indication in PSAP database 330 that a connection load for a particular PSAP 170 has decreased and may send an indication to the other access control device 130 that the connection load for a particular PSAP 170 has decreased.

Although FIG. 3 shows exemplary functional components of access control device 130, in other implementations, access control device 130 may include fewer functional components, different functional components, differently arranged functional components, or additional functional components than depicted in FIG. 3. Additionally or alternatively, one or more functional components of access control device 130 may perform functions described as being performed by one or more other functional components of access control device 130.

Figure 4:
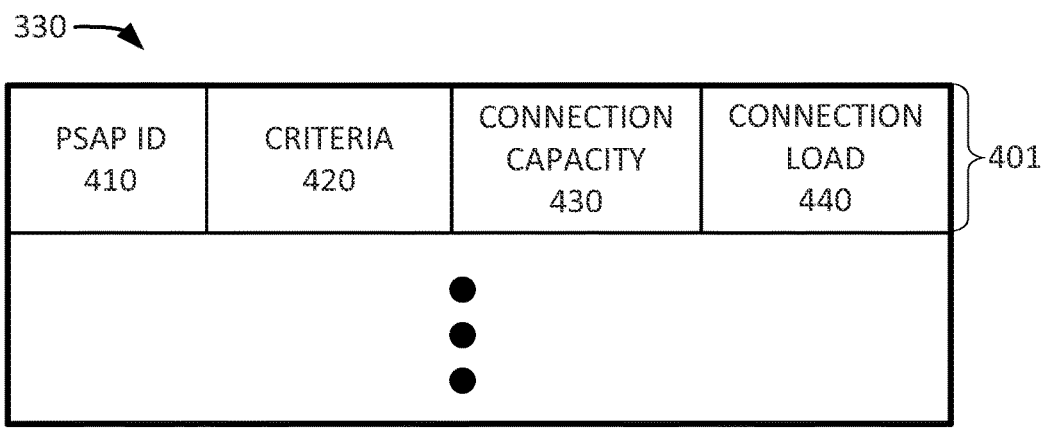
FIG. 4 is a diagram illustrating exemplary components that may be stored in the Public Safety Answering Point database of FIG. 3 according to an implementation described herein.

FIG. 4 is a diagram illustrating exemplary components of PSAP database 330 according to an implementation described herein. As shown in FIG. 4, PSAP database 330 may include one or more PSAP records 401 (referred to herein collectively as "PSAP records 401" and individually as "PSAP record 401"). Each PSAP record 401 may store information for a particular PSAP that may be reachable by user devices 110 that connect to IMS network 140 via access control device 130. PSAP record 401 may include a PSAP identifier (ID) field 410, a criteria field 420, a connection capacity field 430, and a connection load field 440.

PSAP ID field 410 may store information identifying a particular PSAP 170. For example, PSAP ID field 410 may store a name associated with the particular PSAP 170, an IP address associated with the particular PSAP 170, an administrative division (e.g., town, county, etc.) associated with the particular PSAP 170, and/or another type of identifier associated with the particular PSAP 170.

Criteria field 420 may store one or more criteria used to select the particular PSAP 170 for an emergency call from a particular user device 110. In some implementations, the one or more criteria may include a location range, such as a geographic area. Thus, the particular PSAP may be selected if the location of user device 110 is within the location range associated with the particular PSAP. In other implementations, the one or more criteria may include a criterion other than a location of user device 110. For example, the one or more criteria may include a particular access network 120 associated with user device 110, a particular base station associated with user device 110, a particular access control device 130 associated with user device 110, a particular gateway to provider network 140 associated with user device 110, a particular connection through provider network 140 to selective router 160, and/or another type of criterion.

Connection capacity field 430 may store information relating to the connection capacity associated with the particular PSAP. For example, connection capacity field 430 may store information relating to the maximum number of connections from user devices 110 to the particular PSAP, a type of connection and/or bandwidth of the connection from selective router 160 to the particular PSAP (e.g., a DS0 connection, a DS3 connection, etc.), and/or another measure of the connection capacity associated with the particular PSAP.

Connection load field 440 may store information relating to the current capacity load associated with the particular PSAP. For example, connection load field 440 may store information relating to the number of connections from the user devices 110 to the particular PSAP, the available bandwidth of the connection to the particular PSAP, and/or another measure of the connection load associated with the particular PSAP.

The information stored in PSAP database 330 may be obtained from emergency call server 150, from selective router 160, and/or from another access control device 130. For example, emergency call connections manager 320 may obtain a list of PSAPs and associated geographic areas from emergency call server 150, may obtain a routing table from selective router 160, and/or may obtain an indication that a connection load for a particular PSAP has changed from another access control device 130 in access network 120.

Although FIG. 4 shows exemplary components of PSAP database 330, in other implementations, PSAP database 330 may include fewer fields, different fields, differently arranged fields, or additional fields than depicted in FIG. 4.

Figure 5:
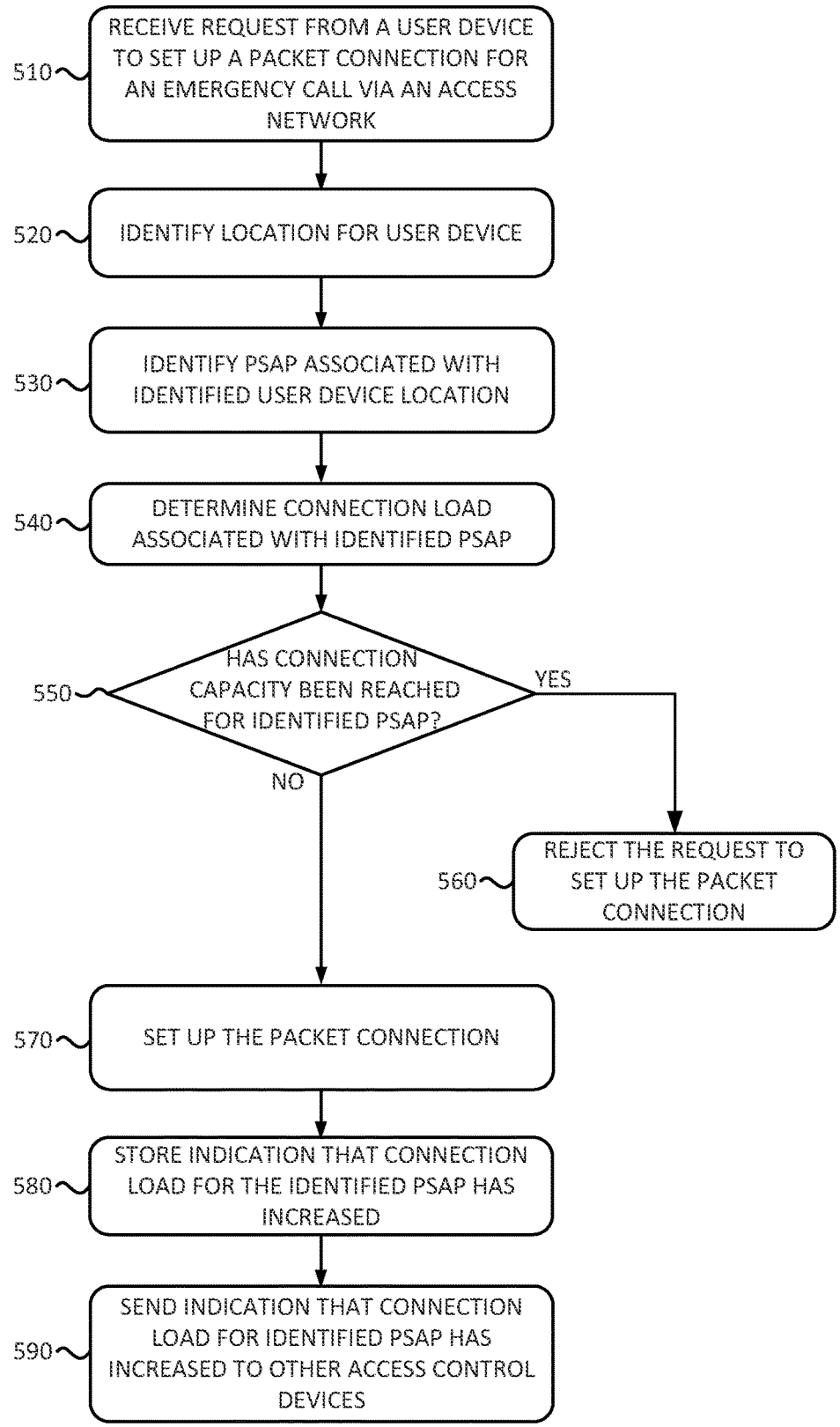
FIG. 5 is a flowchart of an exemplary process for intelligent handling of emergency sessions according to an implementation described herein.

FIG. 5 is a flowchart of an exemplary process for intelligent handling of emergency sessions according to an implementation described herein. In one implementation, the process of FIG. 5 may be performed by access control device 130. In other implementations, some or all of the process of FIG. 5 may be performed by another device or a group of devices separate from access control device 130 and/or including access control device 130.

The process of FIG. 5 may include receiving a request from a user device to set up a packet connection for an emergency call via an access network (block 510). For example, a user of user device 110 may dial an emergency phone number, such as 911. In response, user device 110 may send a request to access control device 130 to set up an IP connection between user device 110 and provider network 140 for the emergency call. Emergency call connections manager 320 may identify the request as being associated with an emergency call.

A location for the user device may be identified (block 520). In some implementations, access control device 130 may maintain information about the location of user device 110. In other implementations, access control device 130 may receive the information about the location of user device 110 along with the request for establishing a connection for the emergency call. In yet other implementations, access control device 130 may request the information about the location of user device 110 from user device 110, and/or from one or more base stations of access network 120, in response to receiving the request for establishing a connection for the emergency call.

The location of the user device may be determined based on a precise location or a coarse location. A precise location may be obtained based on, for example, information obtained by a Global Positioning System (GPS) receiver included in user device 110, and/or based on information obtained from a Subscriber Identification Module (SIM) card included in user device 110. Additionally or alternatively, the location information for user device 110 may be obtained by access network 120 using a multilateration technique and/or another technique based on signals exchanged between user device 110 and one or more base stations associated with access network 120. A coarse location may be obtained based on, for example, an area in which user device is located, such as a zip code, an LTE cell ID, etc.

A PSAP associated with the identified user device location may be identified (block 530). For example, emergency call connections manager 320 may access PSAP database 330 and identify PSAP 170 associated with the location of user device 110 (based on information stored in criteria field 420 of PSAP record 401). In other implementations, other, or additional, criteria may be used to identify a particular PSAP, such as a particular base station associated with user device 110, a particular access network 120 associated with user device 110, a particular access control device 130 associated with user device 110, a particular gateway to provider network 140 associated with user device 110, a particular connection through provider network 140 to selective router 160, and/or another type of criterion.

A connection load associated with the identified PSAP may be determined (block 540). For example, emergency call connections manager 320 may access PSAP record 401 of the identified PSAP and may determine the current connection load based on information stored in connection load field 440 of PSAP record 401, such as the current number of connections from user devices 110 to the identified PSAP.

A determination may be made as to whether a connection capacity has been reached for the identified PSAP (block 550). For example, emergency call connections manager 320 may compare the information stored in connection load field 440 of PSAP record 401 to the information stored in connection capacity field 430 of PSAP record 401 and determine whether any connection capacity remains for the identified PSAP. If the connection capacity has been reached (block 550—YES), the request to set up the packet connection may be rejected (block 560). For example, access control device 130 may not send any request to other devices in access network 120 to reserve resources for an IP connection between user device 110 and provider network 140. Furthermore, access control device 130 send a message that the request has been denied to user device 110. The message may include an explanatory message that may be displayed to the user by user device 110. In some implementations, when the connection capacity has been reached for a PSAP, access control device 130 may send a message to PSAP 170, informing PSAP 170 that the connection capacity has been reached. Furthermore, access control device 130 may receive a message from PSAP 170 that may be forwarded to user device 110.

The message may include instructions that relate to a particular emergency. For example, in a natural disaster scenario, the message may include instructions about how to behave and/or where to go. Thus, if user device calls 911 and a request to set up the connection is denied, the user may receive a message, such as a text message, from access control device 130 that may state "All circuits are busy right now. Please stay where you are and get indoors if possible. Tune to 660 AM for detailed information."

If the connection capacity has not been reached (block 550—NO), the packet connection may be set up (block 570). For example, access control device 130 may instruct a packet data network gateway device, a base station, and/or other devices in access network 120 to set up an IP connection between user device 110 and provider network 140. An indication that the connection load for the identified PSAP has increased may be stored (block 580). For example, emergency call connections manager 320 may update connection load field 440 of PSAP record 401, associated with the identified PSAP, to reflect that a new connection has been added to the identified PSAP.

An indication that the connection load for the identified PSAP has increased may be sent to other access control devices (block 590). For example, access network 120 may include multiple access control devices 130. Thus, multiple access control devices 130 may control the setting up of IP connections to selective router 160 and the multiple access control devices 130 may update each other's PSAP databases 170. As another example, multiple access networks 120 of different types may be deployed in a particular area (e.g., an LTE network and an eHRPD network, etc.) and the multiple access networks 120 may update each other's PSAP databases 170. Thus, when access control device 130 sets up an IP connection to a particular PSAP 170, access control device 130 may send a message to other access control devices 130 in access network 120, or in another access network 120, indicating that the connection load of the particular PSAP 170 has been increased.

If a connection to PSAP 170 is terminated when user device 110 terminates the emergency call, when PSAP 170 terminates the emergency call, or when the emergency call is dropped due to a loss of connection, access control device 130 may update connection load field 440 of PSAP record 401, associated with the identified PSAP, to reflect that a new connection has been removed from PSAP 170. Furthermore, access control device 130 may send a message to other access control devices 130 in access network 120, or in another access network 120, indicating that the connection load of PSAP 170 has been decreased.

Figure 6:
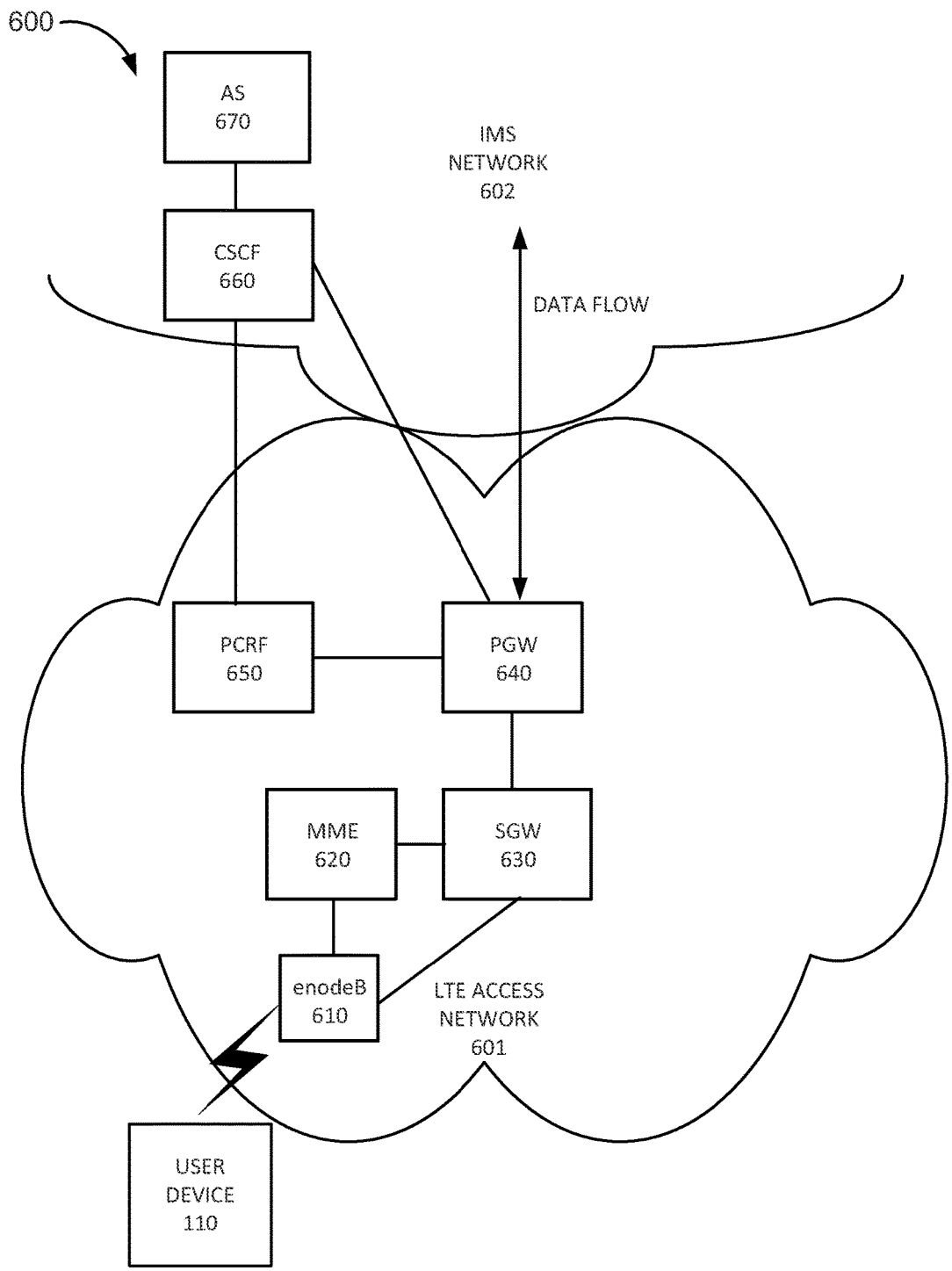
FIG. 6 is a diagram of an exemplary system according to an implementation described herein.

FIG. 6 is a diagram of an exemplary system 600 according to an implementation described herein. As shown in FIG. 6, system 600 may include user device 110, LTE access network 601, which may correspond to access network 120, and IMS network 602, which may be included in provider network 140. LTE access network 601 may include an enodeB 610, an MME 620, a serving gateway (SGW) 630, a PGW 640, and a Policy Charging and Rules Function (PCRF) device 650. IMS network 602 may include a Call Session Control Function (CSCF) device 660, and an Application Server (AS) device 670.

eNodeB 610 may include one or more devices (e.g., base stations) and other components and functionality that allow user device 110 to wirelessly connect to LTE access network 601. eNodeB 610 may interface with MME 620 and with SGW 630. MME 620 may implement control place processing for LTE access network 601, including paging and tracking procedures for user devices 110, activation and deactivation of bearers, authentication of user devices 110, interfacing with non-LTE access networks, and/or other control processes. A bearer may represent a logical channel with particular quality of service (QoS) requirements. SGW 630 may provide an access point for user device 110, may handle forwarding of data packets for user device 110, and may act as a local anchor during handover procedures between different enodeBs 120. PGW 640 may function as a gateway to IMS network 602. PCRF device 650 may implement a policy charging and rule function, such as establishing QoS requirements, bandwidth, and/or charges for a particular service for a particular user device 110.

CSCF device 660 may handle signaling, controlling of media paths, and activation of applications in IMS network 602. AS device 670 may implement particular services and interact with CSCF device 660 to deliver the particular services to user device 110. Examples of services provided by AS device 670 may include multimedia telephone services or IP television services.

Figure 7:
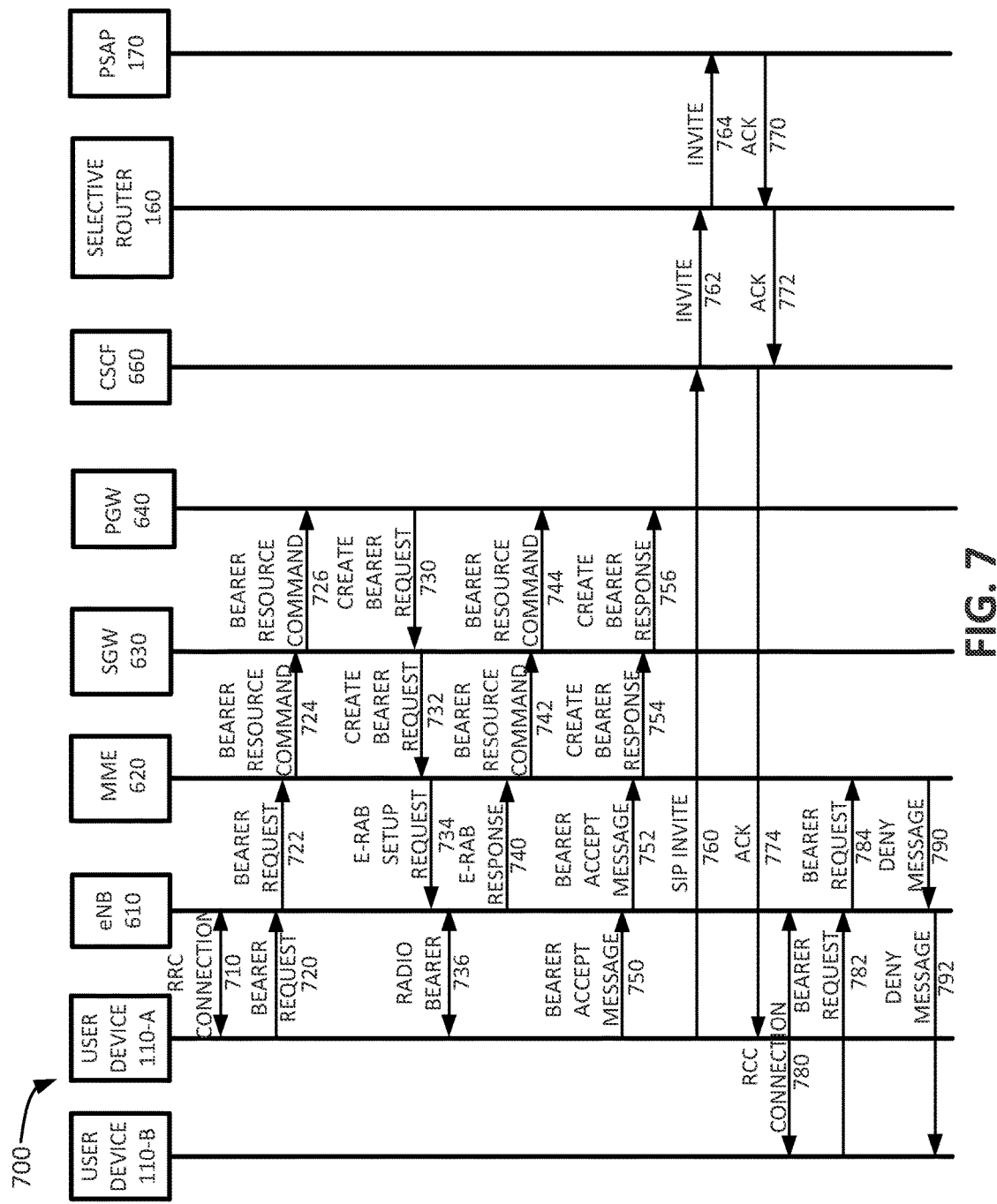
FIG. 7 is a diagram of an exemplary signal flow according to an implementation described herein.

FIG. 7 is a diagram of an exemplary signal flow 700, associated with system 600, according to an implementation described herein. As shown in FIG. 7, signal flow 700 may include user device 110-A, user device 110-B, eNodeB 610, MME 620, SGW 630, PGW 640, CSCF 660, selective router 160, and PSAP 170. Signal flow 700 may begin with user device 110-A establishing a Radio Resource Control (RCC) connection with eNodeB 610 (signal 710). The user of user device 110-A may initiate an emergency call by dialing an emergency telephone number, such as 911. In response, user device 110-A may send a bearer request to MME 620 via eNodeB 610 (signals 720 and 722). MME 620 may detect that the bearer request is for an emergency call and may perform the process of FIG. 5.

MME 620 may determine that the PSAP 170 associated with user device 110-A has available capacity and may select to set up the bearer for the emergency call. Thus, MME 620 may send a bearer resource command 724 to PGW 640 via SGW 630 (signals 724 and 726). PGW 640 may accept the command and may request to create a dedicated bearer for user device 110-A by sending a create bearer request to MME 620 via SGW 630 (signals 730 and 732). MME 620 may respond by sending an enhanced radio access bearer (E-RAB) set up request to eNodeB 610 (signal 736). In response, eNodeB 610 may set up a dedicated radio bearer with user device 110-A (signal 736) and may send an E-RAB response to MME 620 (signal 740).

In response, MME 620 may send a bearer resource command to PGW 640 via SGW 630 (signals 742 and 744) to reserve resources for the dedicated bearer. User device 110-A may send a bearer accept message to MME 620 via eNodeB 610 (signals 750 and 752) and MME 620 may send a create bearer response to PGW 640 via SGW 630 (signals 754 and 756). The dedicated bearer may not be establishes and user device 110-A may have an IP connection to IMS network 602. User device 110-A may send a Session Initiation Protocol (SIP) INVITE message to CSCF 660 (signal 760). CSCF 660 may response by sending a SIP INVITE message to selective router 160 (signal 762). Selective router 160 may access a routing table to determine PSAP 170 associated with the location of user device 110-A and may forward the SIP INVITE message to PSAP 170 (signal 764). PSAP 170 may respond with an acknowledgement (ACK) message to user device 110-A, via selective router 160 and CSCF 660 (signals 770, 772, and 774). The emergency call between user device 110-A and PSAP 170 may now be established.

Assume that the emergency call between user device 110-A and PSAP 170 has resulted in using up the connection capacity of PSAP 170. User device 110-B may establish a Radio Resource Control (RCC) connection with eNodeB 610 (signal 780). The user of user device 110-B may initiate an emergency call by dialing an emergency telephone number, such as 911. In response, user device 110-B may send a bearer request to MME 620 via eNodeB 610 (signals 782 and 784). MME 620 may detect that the bearer request is for an emergency call and may perform the process of FIG. 5. MME 620 may determine that user device 110-B is associated with PSAP 170 based on the location of user device 110-B and may determine that the connection capacity of PSAP 170 has been reached. In response, MME 620 may reject the bearer request and may send a deny message to user device 110-B via eNodeB 610 (signals 790 and 792). Therefore, LTE access network 601 may avoid wasting the resources to set up a dedicated bearer for user device 110-B only to have the emergency call rejected by IMS network 602 when PSAP 170 cannot be reached with a SIP INVITE message.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while some implementations may determine emergency call connections capacity with respect to particular PSAPs 170, other implementations may determine emergency call connections capacity with respect to particular selective routers 160. Thus, in such implementations, PSAP database 330 may maintain information relating to criteria, connection capacities, and/or connection loads associated with particular selective routers 160. When a request from user device 110 is received to set an IP connection for an emergency call, emergency call connections manager 320 may identify a particular selective router 160 associated with user device 110, may determine a current connection load associated with the selective router 160, and may determine whether the connection capacity of the identified selective router 160 has been reached. If the connection capacity of the identified selective router 160 has been reached, the request for the IP connection may be rejected.

As another example, while series of blocks have been described with respect to FIG. 5, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by at least one computer device, the method comprising:
   receiving, by the at least one computer device, a request from a wireless user device to set up a packet connection for an emergency session to a packet data network via a wireless access network;
   determining, by the at least one computer device, a location associated with the wireless user device;
   identifying, by the at least one computer device, a public safety answering point associated with the determined location;
   determining, by the at least one computer device, whether a connection capacity associated with the identified public safety answering point has been reached based on information stored in a public safety answering point database included in the wireless access network and associated with the at least one computer device; and
   rejecting, by the computer device, the request to set up the packet connection for the emergency session, in response to determining that the connection capacity associated with the identified public safety answering point has been reached.

2. The method of claim 1, wherein the wireless access network includes a Long Term Evolution access network and wherein the computer device includes a Mobility Management Entity associated with the Long Term Evolution access network.

3. The method of claim 1, wherein the wireless access network includes a Long Term Evolution access network and wherein the computer device includes a Packet Data Network Gateway associated with the Long Term Evolution access network.

4. The method of claim 1, wherein the wireless access network includes an enhanced High Rate Packet Data access system and wherein the computer device includes an Enhanced Packet Control Function device or a High Rate Packet Data Serving Gateway device.

5. The method of claim 1, further comprising:
setting up the packet connection, in response to determining that the connection capacity associated with the identified public safety answering point has not been reached; and
storing, in the public safety answering point database, an indication that a connection load of the identified public safety answering point has increased, in response to setting up the packet connection.

6. The method of claim 5, further comprising:
terminating the packet connection; and
storing, in the public safety answering point database, an indication that the connection load of the identified public safety answering point has decreased, in response to terminating the packet connection.

7. The method of claim 5, further comprising:
sending, to an access control device that is different from the computer device, an indication that the connection load of the identified public safety answering point has increased, in response to setting up the packet connection.

8. The method of claim 1, further comprising:
receiving, from a particular public safety answering point, information relating to a connection capacity associated with the particular public safety answering point; and
storing the received information in the public safety answering point database.

9. The method of claim 1, wherein determining whether a connection capacity associated with the identified public safety answering point has been reached includes:
accessing the public safety answering point database, wherein the public safety answering point database includes one or more public safety answering point records, wherein each of the one or more public safety answering point records includes:
information identifying a particular public safety answering point;
information identifying a criterion associated with the particular public safety answering point, wherein the criterion is used to select the particular public safety answering point for a particular wireless user device;
information indicating a connection capacity associated with the particular public safety answering point; and
information indicating a connection load associated with the particular public safety answering point.

10. An access control device comprising:
logic configured to:
receive a request from a wireless user device to set up a packet connection for an emergency session to a packet data network via a wireless access network;
determine a location associated with the wireless user device;
identify a public safety answering point associated with the determined location;
determine whether a connection capacity associated with the identified public safety answering point has been reached based on information stored in a public safety answering point database included in the wireless access network and associated with the access control device; and
reject the request to set up the packet connection for the emergency session, in response to determining that the connection capacity associated with the identified public safety answering point has been reached.

11. The access control device of claim 10, wherein the wireless access network includes a Long Term Evolution access network and wherein the access control device includes a Mobility Management Entity associated with the Long Term Evolution access network.

12. The access control device of claim 10, wherein the wireless access network includes a Long Term Evolution access network and wherein the access control device includes a Packet Data Network Gateway associated with the Long Term Evolution access network.

13. The access control device of claim 10, wherein the wireless access network includes an enhanced High Rate Packet Data access system and wherein the access control device includes an Enhanced Packet Control Function device or a High Rate Packet Data Serving Gateway device.

14. The access control device of claim 10, wherein the logic is further configured to:
set up the packet connection, when the connection capacity associated with the identified public safety answering point has not been reached; and
store, in the public safety answering point database, an indication that a connection load of the identified public safety answering point has increased, in response to setting up the packet connection.

15. The access control device of claim 14, wherein the logic is further configured to:
terminate the packet connection; and
store, in the public safety answering point database, an indication that the connection load of the identified public safety answering point has decreased, in response to terminating the packet connection.

16. The access control device of claim 14, wherein the logic is further configured to:
send, to another access control device, an indication that the connection load of the identified public safety answering point has increased, in response to setting up the packet connection.

17. The access control device of claim 10, wherein the logic is further configured to:
receive, from a particular public safety answering point, information relating to a connection capacity associated with the particular public safety answering point; and
store the received information in the public safety answering point database.

18. The access control device of claim 10, wherein the public safety answering point database includes:
information identifying a particular public safety answering point;
information identifying a criterion associated with the particular public safety answering point, wherein the criterion is used to select the particular public safety answering point for a particular wireless user device;
information indicating a connection capacity associated with the particular public safety answering point; and
information indicating a connection load associated with the particular public safety answering point; and
wherein, when the logic is configured to determine whether a connection capacity associated with the identified public safety answering point has been reached, the logic is further configured to:
access the public safety answering point database.

19. A non-transitory computer-readable medium storing instructions executable by one or more processors, the non-transitory computer-readable medium comprising:
- one or more instructions to receive a request from a wireless user device to set up a packet connection for an emergency session to a packet data network via a wireless access network;
- one or more instructions to determine a location associated with the wireless user device;
- one or more instructions to identify a public safety answering point associated with the determined location;
- one or more instructions to determine whether a connection capacity associated with the identified public safety answering point has been reached based on information stored in a public safety answering point database included in the wireless access network; and
- one or more instructions to reject the request to set up the packet connection for the emergency session, in response to determining that the connection capacity associated with the identified public safety answering point has been reached.

20. The non-transitory computer-readable medium of claim 19, further comprising:
- one or more instructions to set up the packet connection, when the connection capacity associated with the identified public safety answering point has not been reached;
- one or more instructions to store, in the public safety answering point database, an indication that a connection load of the identified public safety answering point has increased, in response to setting up the packet connection; and
- one or more instructions to send, to an access control device, an indication that the connection load of the identified public safety answering point has increased, in response to setting up the packet connection.

* * * * *